Figure 1:
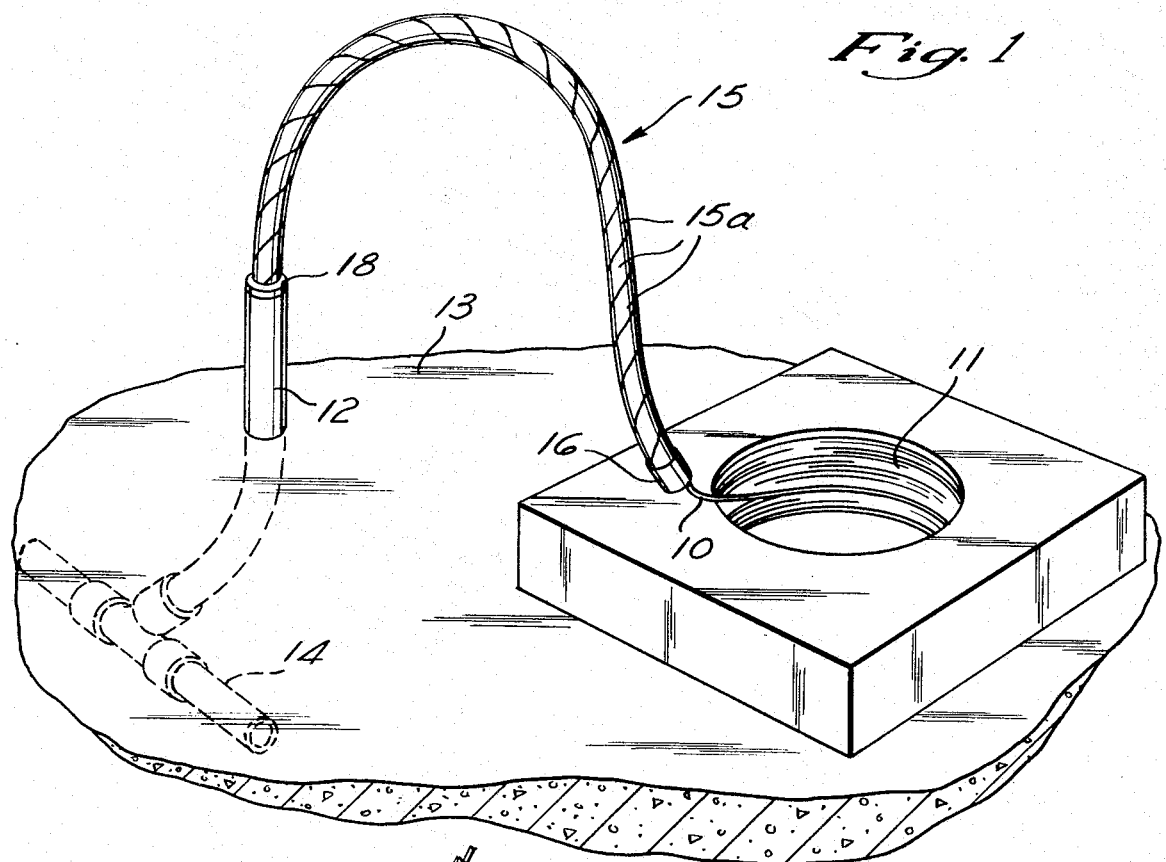

United States Patent [19]
Peirce, Jr.

[11] 3,868,090
[45] Feb. 25, 1975

[54] WIRE GUIDING ARRANGEMENT
[76] Inventor: Benjamin F. Peirce, Jr., 1040 S.W. 67th Ter., Plantation, Fla. 33317
[22] Filed: Feb. 19, 1974
[21] Appl. No.: 443,342

[52] U.S. Cl. .................................... 254/134.3 R
[51] Int. Cl. ............................................ E21c 29/16
[58] Field of Search ............ 254/134.3 R, 134.3 FT

[56] References Cited
UNITED STATES PATENTS
2,916,259  12/1959  Eyles ......................... 254/134.3 FT
3,037,744  6/1962  Cooper ...................... 254/134.3 FT Primary Examiner—Othell M. Simpson
Attorney, Agent, or Firm—Oltman and Flynn

[57] ABSTRACT

A line guide for guiding wire or cable from a supply roll into the open end of a wiring conduit in a building. This line guide includes a helically wound flexible plastic tube with adhesive tape wrapped around each end and a plug on the outside near one end for snug reception in the open end of the conduit.

2 Claims, 2 Drawing Figures

PATENTED FEB 25 1975 3,868,090

WIRE GUIDING ARRANGEMENT

BACKGROUND OF THE INVENTION

In my co-pending U.S. patent application, Ser. No. 442,925, entitled "WIRING ARRANGEMENT" and filed concurrently herewith, I have disclosed a unitary wiring conduit system for installation in buildings under construction, such as apartment buildings or townhouses, in which there are a multiplicity of individual points of use at different locations in the building. This conduit system includes a branch conduit for each point of use and a main conduit leading from all the branch conduits to a single terminal for the building.

SUMMARY OF THE INVENTION

The present invention is directed to a novel arrangement for guiding a wire or cable from a supply roll at a particular telephone station or other point of use in the building into the branch conduit there, to be pulled through that branch conduit into the main conduit and through the latter to the terminal.

A principal object of this invention is to provide a novel and improved wire guiding arrangement that facilitates the installation of individual wiring for different points of use in a building through individual branch conduits that are connected to a main conduit leading from a single terminal.

Another object of this invention is to provide such a wire guiding arrangement which provides a smooth and easy entry of the individual wires into the branch conduits and from there into the main conduit, and which minimizes the possibility of tangling the several individual wires in the main conduit.

Another object of this invention is to provide such a wire guiding arrangement which makes it easier to pull as many as 10 or 15 individual telephone station wires together through the main conduit from individual telephone stations to a single telephone terminal.

Figure 2:
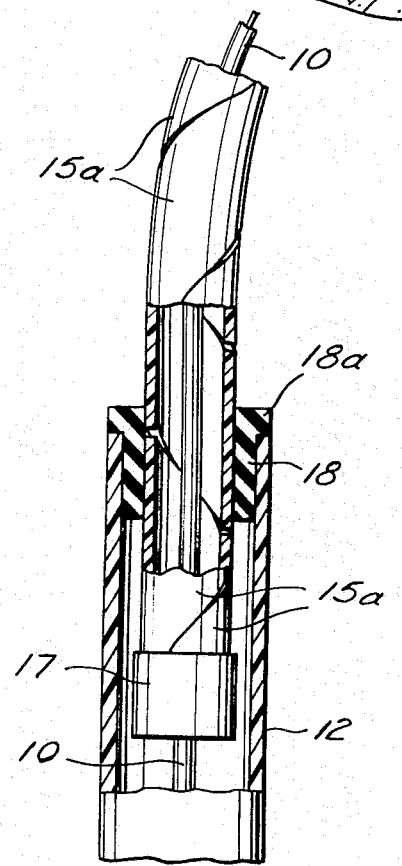

Further objects and advantages of this invention will be apparent from the following detailed description of a presently-preferred embodiment thereof, which is illustrated in the accompanying drawing in which:

FIG. 1 is a perspective view showing the present line guide inserted into the open end of a branch conduit and guiding a telephone wire from a supply roll into the branch conduit to pass through the latter into a main conduit; and FIG. 2 is a view on an enlarged scale, partly in end elevation and partly in vertical section, showing the mounting of the line guide in the branch conduit.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the description that follows the present line guide arrangement is used to guide individual telephone wires at different branch conduits into the main conduit of a telephone wiring system. However, it is to be understood that it is applicable to the guiding of electrical cables in a power wiring system for a building, in which each power socket in the building is an individual point of use.

Referring first to FIG. 1, the telephone wire 10 that is to provide the service for an individual telephone station in the building comes off the usual boxed supply roll 11. The purpose of the present invention is to guide this wire from the supply roll into and through a branch conduit 12 that extends up through the floor 13 of the building from a horizontal main conduit 14. The main conduit extends from a telephone terminal (not shown) for the building, and several branch conduits similar to the one shown are connected to this main conduit at different locations along its length.

In the presently preferred embodiment, as shown, the present line guide comprises an elongated, hollow, tubular member 15 of suitable plastic material, such as polyvinyl chloride, having helically wound turns 15a which abut against one another in succession in the normal, unstressed condition. The pitch of these helically wound turns of tubular member 15 is substantially greater than its outside diameter, and its inside diameter is several times the outside diameter of the telephone wire 10, as best seen in FIG. 2.

Pressure sensitive adhesive tape is wrapped tightly around member 15 at each end, as shown at 16 in FIG. 1 and at 17 in FIG. 2, to hold the adjoining turns 15a together at each end.

A plug 18, which snugly surrounds the outside of the helically wound, tubular, wire guide member 15 near one end, is snugly received in the open upper end of branch conduit 12. This plug limits the insertion of wire guide member 15 in the branch conduit. In the particular embodiment shown, the plug 18 is a cylinder of rubber or a rubber-like plastic, and it has a transverse outer flange 18a at the top that abuts against the open top of the branch conduit 12. If desired, however, the plug 18 may be provided by an adhesive tape that is wound in enough overlapping turns around the wire guide member 15 to provide a sufficient plug thickness for a snug fit in the branch conduit.

In the use of this line guide, preferably a pull cord line will have been inserted lengthwise through the main conduit and extending out to the telephone terminal for the building, with a branch loop of this line extending from the main conduit up through each branch conduit 12. The end of the individual telephone station wire 10 for each of the individual telephone stations in the building is suitably attached to the end of the corresponding branch loop in the pull line. When all of the individual wires 10 have been so attached, the pull line is pulled through at the building terminal, and it pulls all of the individual station wires 10 with it. These individual wires preferably are suitably coded to facilitate their wiring connections at the building terminal.

As shown in FIG. 1, the individual station wire 10 is pulled from the supply roll 11 up through the helically wound guide 15 and then down into the branch conduit 12, from which it passes into the main conduit.

Usually, the boxed supply roll 11 of telephone wire rests on the floor and the branch conduit 12 projects up several inches above the floor level, to a position a few inches higher than the top of the telephone wire supply roll. The guide 15 bends readily to the approximately U-shaped configuration depicted in FIG. 1 to accommodate the passage of the wire but without any abrupt discontinuities or corners, either at its juncture with the branch conduit 12 or at the opposite end where the wire 10 enters from the supply roll 11 or anywhere in between. The guide is flexible and follows the wire as it unwinds. Consequently, the present line guide arrangement provides for an easy, relatively friction-free passage of the telephone wire from the supply roll into the branch conduit, and there is virtually no tendency for the wire to become tangled or knotted anywhere in the branch conduit or the main conduit.

The relatively long pitch and small diameter of the helical turns of guide member 15 makes it relatively easy to bend manually. When bent as shown in FIG. 1, its successive turns separate at the outside of the bend and they overlap one another at the inside of the bend. The end tapes 16 and 17 hold the adjoining turns tightly together at both ends of the guide member.

The plug 18 not only limits the insertion of the wire guide into the branch conduit, it also centers it in the branch conduit and thereby minimizes the possibility that the wire will rub against the branch conduit.

I claim:

1. A line guide for feeding a wire or cable into a conduit having an open end of a predetermined inside diameter comprising:

an elongated preformed hollow, tubular guide member having successive helically wound longitudinally flat turns of insulating plastic preformed to normally abut endwise against one another in succession and form a tube, said guide member being manually bendable by the separation of its successive turns from abuting relationship with each other at the outside of the bend, and the pitch of said turns being greater than the outside diameter of said tube;

a retainer fixed around the outside of each end of said guide member to hold said turns together;

and a plug on the outside of said guide member near one end for snug reception in said open end of the conduit into which the wire or cable is to be fed.

2. In a combination with a wiring conduit having an open end of a predetermined inside diameter, an improved wire guide for feeding a wire or cable into the conduit comprising:

an elongated, preformed, hollow, tubular manually bendable guide member having successive helically wound longitudinally flat turns of insulating material which are preformed to normally abut endwise against one another in succession and form a substantially straight tube, said turns being separable from abutting relationship with each other when said guide member is bent manually from its normal substantially straight shape, and the pitch of said turns being greater than the outside diameter of said tube;

said guide member extending from outside the conduit into said open end of the conduit;

a retainer affixed around the outside of each end of said guide member to hold said turns together;

and a plug on the outside of said guide member snugly received in said open end of the conduit and positioning said guide member securely with respect to the conduit.

* * * * *